Figure 1:
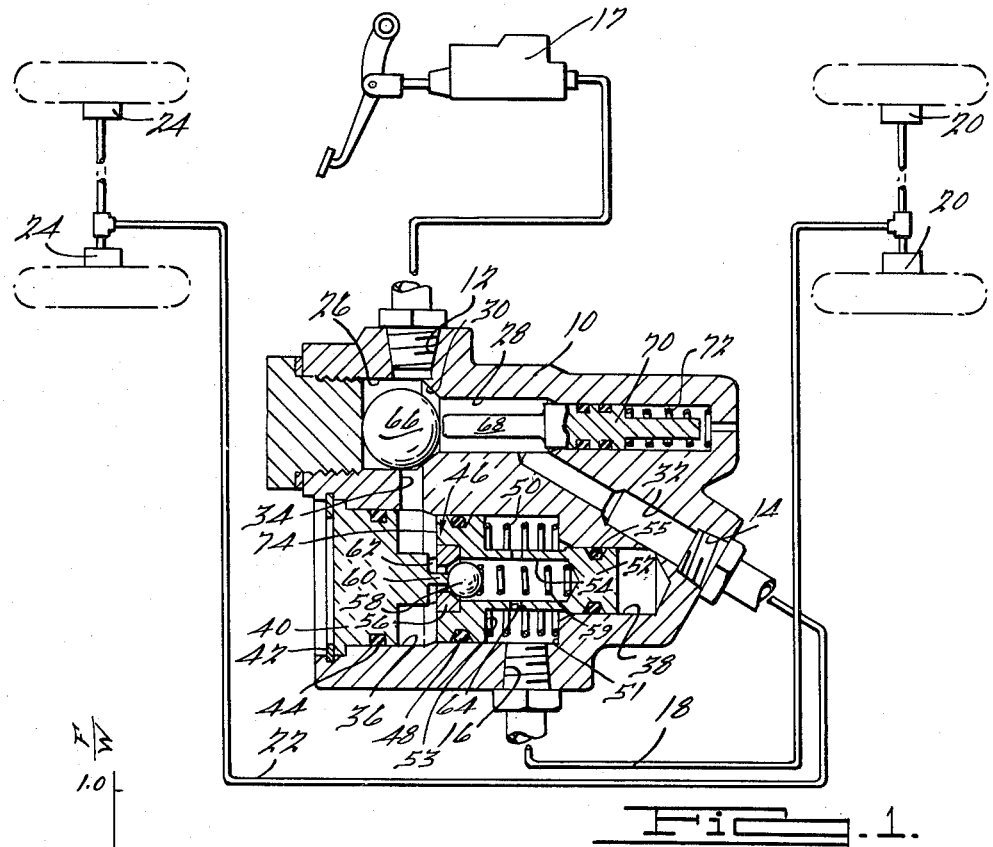

Dec. 29, 1964   W. STELZER   3,163,473
BRAKE PRESSURE PROPORTIONING DEVICE
Filed Dec. 18, 1961

INVENTOR.
William Stelzer
BY
*Barnes, Dickey & Pierce.*
ATTORNEYS

United States Patent Office 3,163,473
Patented Dec. 29, 1964

3,163,473
BRAKE PRESSURE PROPORTIONING DEVICE
William Stelzer, Bloomfield Hills, Mich., assignor to Kelsey-Hayes Company, Romulus, Mich., a corporation of Delaware
Filed Dec. 18, 1961, Ser. No. 159,970
11 Claims. (Cl. 303—6)

This invention relates to hydraulic brake systems for vehicles and particularly to a device for varying the pressurization of the front and rear brake cylinders of a vehicle in accordance with the change in weight distribution between the front and rear wheels occasioned by rapid deceleration of the vehicle.

It is well known that the effective braking effort of which a wheel is capable is dependent upon the weight carried by the wheel. For this reason it is common to proportion the size of the hydraulic brake cylinders of the front and rear wheels in accordance with the proportion of weight carried by the front and rear wheels of the vehicle. For example, in front engine passenger cars it is customary to provide brake cylinders on the front wheel brakes of greater size than the cylinders on the rear wheel brakes. Thus brake fluid delivered to the front and rear brake cylinders from a common master cylinder will result in the application of a greater braking force at the front wheels than at the rear.

While the foregoing variation in brake cylinder size may be utilized to adjust for the static weight distribution of the vehicle, it is well known that the weight distribution of the vehicle fluctuates or varies as the vehicle is decelerated. During deceleration a portion of the weight borne by the rear wheels of the vehicle is transferred to the front wheels of the vehicle. In an ideal braking system it is therefore desirable to reproportion the braking forces between the front and rear wheels in accordance with this weight transfer. This adjustment is also highly desirable in order to maintain driver control of the vehicle. Excessive pressurization of the rear brakes with the reduced weight carried by the rear wheels can result in premature rear wheel skidding. The loss of coefficient of friction between the rear wheels and the road will cause the rear wheels to attempt to overrun the front wheels and thereby produce a sideways skidding of the car causing the driver to lose control of the vehicle. It is therefore an object of the present invention to provide a hydraulic fluid transmission device for a vehicle hydraulic brake system which is capable of reproportioning the relative pressurization of the front and rear wheel brakes in accordance with the transfer of weight from the rear to the front wheels during vehicle deceleration.

It is another object of the present invention to provide a brake pressure proportioning device for a vehicle hydraulic brake system which is effective to prevent premature rear wheel skidding during deceleration while at the same time permitting maximum utilization of both the front and rear brakes during both normal and rapid stops to effect stoppage of the vehicle within the shortest possible distance.

It is still another object of the present invention to provide a brake pressure proportioning device for a vehicle hydraulic brake system in which the total or combined braking effort delivered to the front and rear wheel brakes is maintained at a constant level even though the ratio of the front and rear wheel braking efforts is changed.

It is another object of the present invention to provide a brake proportioning device which is effective to increase the pressurization of the front brakes while simultaneously decreasing the pressurization of the rear brakes by a like amount upon the attainment of vehicle deceleration of a predetermined amount.

It is still another object of the present invention to provide a brake pressure proportioning device of the above character having incorporated therein means adapted to prevent premature actuation of the device as the result of the vehicle being driven on a downward incline, slight surges in fluid brake pressure and the like.

Figure 2:
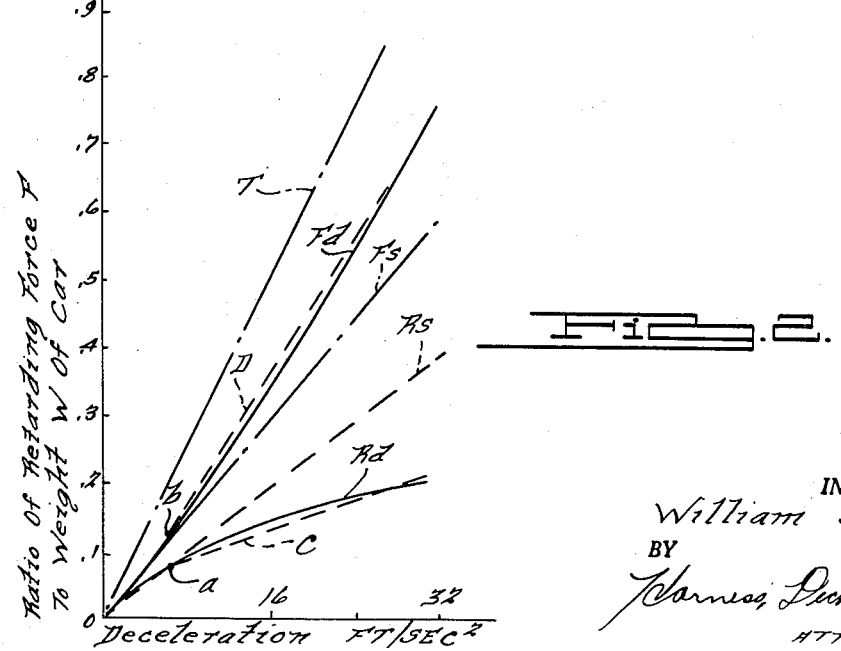

These and other objects of the present invention will become apparent from the following detailed description taken in conjunction with the accompanying drawings wherein:

FIGURE 1 is a vertical sectional view through a device embodying the principles of the present invention, the device being shown in association with a diagrammatically illustrated brake system; and FIGURE 2 is a graph showing actual and ideal braking efforts as a function of deceleration.

Referring now to the drawings, a housing or body is shown generally at 10 and is provided with an inlet opening 12 and outlet openings 14 and 16. The inlet opening 12 is connected to the usual brake master cylinder 17 while outlet opening 16 is connected through a conduit 18 to the vehicle front brake cylinders 20. The outlet opening 14 is connected through conduit 22 to the rear brake cylinders 24. The housing 10 is formed with a chamber 26 in communication with the inlet opening 12. The chamber 26, in turn, communicates with a passage 28, with a combined conical ramp and valve seat surface 30 interposed therebetween. The surface 30 is centrally open and is formed coaxially with respect to the passage 28. The axis of the surface 30 is normally horizontal as the device is mounted on the vehicle. A bypass passage 32 provides fluid communication between the outlet opening 14 and the passage 28. In addition a passage 34 provides fluid communication from the chamber 26 to a bore 36 positioned beneath the chamber 26. The bore 36 is of stepped diameter and includes a reduced diameter portion 38 at the right-hand end thereof as viewed in FIGURE 1. The bore portion 38 opens directly into passage 32 to provide fluid communication therebetween.

As may be seen in FIGURE 1, the chamber 36 is closed at its left-hand end by means of a plug or closure member 40 held in position by a clip 42 and provided with an O-ring 44 to prevent the escape of fluid thereby and seal the bore 36 from the atmosphere. A multi-diameter piston 46 is positioned within the bore 36 and is provided with an O-ring seal 48 sealingly engaging the wall of the bore 36. A light weight return spring 50 is positioned within the bore 36 and engages an end wall 51 thereof to apply spring pressure against an annular shoulder 53 formed on the right-hand side of the piston 46. A reduced diameter piston portion 52 extends from the main portion thereof and is snugly and slidably received within the reduced diameter bore portion 38. The piston portion 52 carries an O-ring 55 on its periphery which sealingly contacts the wall of the bore portion 38 to prevent the passage of fluid thereby.

The piston 46 is formed with a blind bore or opening 54 which is open to the bore 36 through an annular valve seat member 56. A check valve element in the form of a ball 58 is positioned within the opening 54 and is biased to a position of closure with respect to the valve seat member 56 by a spring 59. However, as illustrated in FIGURE 1, the ball 58 is held in an open position away from the valve seat member 56 by a projection 60 integrally formed on the closure member 40. The projection 60 passes through the opening of the valve seat member 56 while the valve seat member is held under the influence of spring 50 against spaced bosses 62 surrounding the projection 60. Thus, an open passage for the direct transmission of fluid pressure is formed from the passage 34 to the bore 36 through the valve seat member 56 to the interior of the opening 54. From the opening 54, fluid pressure is directly transmitted through a plurality of openings 64 formed in the reduced diameter portion 52 of the piston leading to the right-hand end of the bore 36. From this location, fluid pressure is freely transmitted to the outlet opening 16 and thence to the front wheel brake cylinders 20. This is the path of transmission of braking pressure to the front wheels during initial setting of the brakes or during light braking effort.

The device of the present invention becomes effective to change the ratio of braking pressures upon movement or actuation of a valve element in the form of a ball 66 positioned within the chamber 26. When the vehicle is decelerated at a sufficiently high rate, the momentum of the ball 66 will carry it up the combined ramp and valve seat surface 30 until it assumes a position of closure with respect to the surface 30 and blocks the direct transmission of fluid pressure from the inlet opening 12 to the passage 28. It will be noted, however, that a plunger element 68 is shown in FIGURE 1 in a position blocking movement of the ball 66 up the ramp surface 30. The plunger element 68 is integrally formed with a piston 70 sealingly but slidably fitted within an extension of the passage 28. The piston 70 is held in the forward position illustrated in FIGURE 1 by a spring 72. The spring 72 is proportioned to yield under the influence of fluid pressure acting against the piston 70 and plunger 68 when said fluid pressure has reached a preselected magnitude of, for example, 120 to 150 pounds per square inch. This pressure is an amount in excess of that required to initially set the brakes but is lower than all brake pressures which might be expected to produce a deceleration sufficient to cause actuation and closure of the ball 66. Thus, the plunger 68 prevents the ball 66 from being accidentally washed up the ramp surface 30 by initial large volume flow of brake fluid. It also prevents premature closure of the ball 66 as a result of downhill travel of the vehicle. By the time the piston 70 and plunger 68 have retracted away from the ball 66, further movement of brake fluid past the ball 66 will be so slight as not to run the risk of carrying the ball 66 with it.

After retraction of the piston 70 and plunger 68, the ball 66 is in readiness for movement to a position of closure. The exact rate of deceleration at which closure will occur is dependent upon the angle of the conical surface 30. This angle may be empirically determined and established according to the weight distribution, wheel base, height of center of gravity, etc., of the vehicle on which the device is to be used. After closure of the ball 66, it will be apparent that further pressurization of the rear wheel brakes 24 can only occur by movement of the small diameter piston portion 52 in a right-hand direction within the bore portion 38. However, fluid pressure is still freely transmitted from the inlet opening 12, through the annular valve seat member 56 to the front wheel brake cylinders 20. As further braking force is applied to increase the pressure of fluid delivered from the master cylinder 17, the fluid pressure within the bore 36 will be increased. This fluid pressure acts on the left-hand face 74 of the piston 46 over an effective area equal to the diameter of the face 74. This is offset by the same brake fluid pressure acting against the annular shoulder 53, plus the fluid pressure within the right-hand end of the bore portion 38 acting against the end of the small diameter piston portion 52. In view of the fact that increased pressure from the master cylinder 17 will increase pressure within the main portion of the bore 36 but not fluid pressure at the right-hand end of the bore portion 38, the further application of brake pressure will tend to move the piston 46 in a right-hand direction. The return spring 50 is very light weight and offers little resistance to this movement. As this occurs, the ball 58 will seat against the valve seat member 56 and further brake fluid will be displaced to the front wheel brake cylinders in a volume established by the area of the annular piston shoulder 53. This area is greater than the cross-sectional area of the small diameter piston portion 52 and, accordingly, a greater volume of brake fluid will now be displaced to the front brake cylinders 20 than to the rear brake cylinders 24. Inasmuch as the braking effort exerted by said brake cylinders is dependent upon the magnitude of brake fluid delivered thereto, the front wheel brake cylinders 20 will be effective to exert a greater braking pressure in the front wheel brake cylinders than is developed in the rear wheel brake cylinders of the vehicle. It will thus be seen that continued movement of the piston 46 results in greater ratio front wheel braking pressure compared to rear wheel braking effort. As a result, an even greater ratio of front wheel braking effort to rear wheel braking effort is produced.

Upon release of the braking pressure from the master cylinder 17, the piston 46 will move to the left to reduce the pressure on the brake cylinders to master cylinder pressure level. The return spring 50 will then hold the piston 46 in the poistion shown and the ball 66 will also return to its illustrated position. From the foregoing, it will be seen that the proportioning device of the present invention serves to transmit fluid pressure from a fluid pressure producing means (the master cylinder 17) to a fluid pressure receiving means (the front and rear brake cylinders 20 and 24, respectively). During initial and low deceleration braking, the device transmits fluid under conditions of equal pressure through the system. However, after reaching a predetermined rate of vehicle deceleration, the device becomes effective to displace fluid to the front and rear brake cylinders in unequal volumes of a fixed ratio to produce a greater pressure in the front wheel cylinders than in the rear wheel cylinders. The path for the direct transmission of fluid pressure between the front and rear wheel cylinders prior to said predetermined rate of deceleration is blocked by the closure of the ball 66 and, thus, unequal pressures can thereafter be developed in the brake cylinders to change the ratio of the braking efforts of the front and rear wheels.

FIGURE 2 is a graph illustrating braking efforts as a function of deceleration. In the graph, the line T indicates the total braking effort or retarding force of all wheels for given amounts of deceleration. The braking effort or retarding force is expressed in the form of a ratio to the total weight of the vehicle. Lines $Fs$ and $Rs$ represent the relative retarding efforts of the front and rear brakes in the absence of the proportioning device of the present invention. The difference between these lines may be assumed to be the result of the use of different size brake cylinders in view of the variation of static weight loading of the wheels. Lines $Fd$ and $Rd$ represent the ideal relative retarding forces of the front and rear brakes during deceleration for producing maximum braking effort without premature skidding of one set of wheels. Lines $Fd$ and $Rd$ correspond to the transfer of weight from rear to front wheels during deceleration. It will be noted that the proportion of the retarding force of the rear brakes to the front brakes is reduced as deceleration is increased. Points $a$ and $b$ on lines $Rd$ and $Fd$ represent the point of closure of the ball valve 66. Line C represents the retarding force delivered by the rear wheels subsequent to closure of the ball 66 and line D represents the retarding force delivered to the front wheels subsequent to the closure of the ball 66. It will be seen that both lines C and D closely approximate the ideal braking forces and permit the maximum utilization of both front and rear brakes without premature skidding of either set of wheels. It will also be seen that, not only is the braking force to the rear wheels reduced, but the braking effort delivered to the front wheels is increased over that which would prevail in the absence of the use of the device of the present invention. Accordingly, it is not necessary for the driver of the vehicle to apply the brakes with any greater force to achieve the same total braking effort in a brake system utilizing the device of the present invention.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:

1. In a hydraulic brake system for a vehicle having first and second fluid pressure actuated braking means, a pressure proportioning control device adapted to be connected to a master cylinder or the like including piston means having a first fluid displacing portion operable to displace fluid to one of said fluid pressure actuated means and a second fluid displacing portion operable to displace fluid to the other of said fluid pressure actuated means separately from the fluid displaced by said first fluid displacing portion but simultaneously therewith, said first and second fluid displacing portions having dissimilar effective areas whereby a greater volume of fluid is displaced by one of said fluid displacing means than by the other said fluid displacing portions, a bypass for the direct flow of fluid to one of said fluid pressure actuated braking means past at least one of said fluid displacing portions and valve means for closing said bypass after predetermined initial brake application.

2. The structure set forth in claim 1, including means to prevent said valve means from closing until a predetermined fluid pressure from said fluid pressure producing means is reached.

3. A brake pressure control device for a vehicle having front and rear brake cylinders, including a housing having first and second outlet openings adapted to be connected to said front and rear brake cylinders, respectively, plural fluid displacing means in said housing simultaneously operable to displace a small volume of fluid to said second outlet opening and a relatively larger volume of fluid to said first outlet opening in a fixed ratio to the fluid displaced to said second outlet opening to produce a higher fluid pressure in said front brake cylinders than in said rear brake cylinders, means providing a path for the direct transmission of fluid pressure between said first outlet opening and said second outlet opening, and means operable to effect closure of said path whereby fluid displaced to said first and second outlet openings after closure of said valve means will be in volumes controlled by said fluid displacing means.

4. A brake pressure control device for use in an automotive vehicle having front and rear brake cylinders, including a housing, piston means in said housing having first and second fluid displacing surface areas adapted to displace fluid separately and simultaneously to said front and rear brake cylinders, said first fluid displacing surface area being greater than said second fluid displacing area to displace a greater volume of fluid to said front brake cylinders than said rear brake cylinders and to produce a greater fluid pressure in said front brake cylinders than in said rear brake cylinders, means adapted to provide a path for the direct transmission of fluid pressure between said front brake cylinders and said rear brake cylinders, and valve means for closing said path after a predetermined brake application.

5. A brake pressure control device for use in an automotive vehicle having a source of fluid pressure and front and rear brake cylinders, including a housing having a first outlet opening for connection to said front brake cylinders and a second outlet opening for connection to said rear brake cylinders, piston means in said housing exposed to said source of fluid pressure and having a first fluid displacing surface area adapted to displace fluid to said first outlet opening and a second fluid displacing surface area adapted to displace fluid to said second outlet opening in a lesser volume than the fluid displaced to said first outlet opening, said first and second fluid displacing areas being arranged to displace fluid simultaneously to said first and second outlet openings, means for actuating said piston means, bypass means for the direct transmission of fluid pressure from said source of fluid pressure to at least one of said outlet openings, and deceleration responsive means for closing said bypass means whereby the pressurization of said front and rear brake cylinders thereafter will be controlled by the volume of fluid displaced thereto by said first and second surface areas.

6. A brake pressure control device for a vehicle including a housing having an inlet opening, a first outlet opening, a second outlet opening and a bore disposed in fluid communication between said inlet opening and said outlet openings, piston means in said bore adapted to be moved by inlet fluid pressure and having a first fluid displacing surface and a second fluid displacing surface of greater effective area than said first fluid displacing surface, said first fluid displacing surface being arranged to displace fluid to said first outlet opening and said second fluid displacing surface being arranged to displace fluid to said second outlet opening simultaneously with the displacement of fluid to said first outlet opening by said first fluid displacing surface, means in said housing providing passages for the direct transmission of inlet fluid pressure to said outlet openings past said piston and valve means arranged to effect closure of said passages upon the occurrence of predetermined braking conditions.

7. A brake pressure control device for a vehicle including a housing having an inlet opening, a first outlet opening, a second outlet opening and a bore disposed in fluid communication between said inlet opening and said outlet openings, a piston disposed in said bore for movement under the influence of inlet fluid pressure, said piston having a face on one side thereof disposed in communication with said inlet opening and two fluid displacing faces on the other side thereof which are of different area and are sealed from one another, one of said fluid displacing faces being arranged to displace fluid to said first outlet opening and the other of said fluid displacing faces being arranged to displace fluid to said second outlet opening, means in said housing providing a passage for the direct transmission of inlet fluid pressure from said inlet opening to at least one of said outlet openings, and a deceleration responsive valve element for closing said passage.

8. A brake pressure control device for a vehicle including a housing having an inlet opening, a first outlet opening, a second outlet opening and a bore disposed in fluid communication with said inlet opening at one end thereof, said bore having a large diameter portion in communication with said second outlet opening at the end thereof opposite from the end in communication with said inlet opening and a small diameter portion in fluid communication with said first outlet opening, a piston disposed in said bore having a large diameter portion slidably and sealingly disposed in said large diameter bore portion, said piston having a small diameter portion projecting from said large diameter portion and extending into said small diameter bore portion for sliding sealed movement therein, an annular shoulder on said large diameter piston portion extending around said small diameter portion and arranged in fluid displacing relationship with said second outlet opening, means in said housing providing a passage for the direct transmission of fluid pressure from said inlet opening to at least one of said outlet openings, and a deceleration responsive valve element for closing said passage whereby the application of further brake pressure will result in the movement of said piston and the displacement of further fluid to said outlet openings by said piston.

9. A brake pressure control device for a vehicle including a housing having an inlet opening, a first outlet opening, a second outlet opening, a bore disposed in fluid communication between said inlet opening and said outlet openings and a first passage providing direct fluid communication between said inlet opening and at least one of said outlet openings, a piston disposed in said bore for movement under the influence of inlet fluid pressure, said piston having first and second fluid displacing surfaces of different effective areas arranged in fluid displacing relation with said first and second outlet openings, respectively, a deceleration responsive valve element for closing said first passage and initiating movement of said piston, and means providing a second passage for the direct transmission of fluid pressure from said inlet opening to the other of said outlet openings, said second passage being closed by initial movement of said piston.

10. A brake pressure control device for a vehicle including a housing having an inlet opening, a first outlet opening, a second outlet opening, a bore disposed in fluid communication between said inlet opening and said outlet openings and a first passage providing direct fluid communication between said inlet opening and at least one of said outlet openings, a piston disposed in said bore for movement under the influence of inlet fluid pressure, said piston having first and second fluid displacing surfaces of different effective areas arranged in fluid displacing relation with said first and second outlet openings, respectively, said piston having a second passage therethrough for the direct transmission of fluid pressure from said inlet opening to said second outlet opening, a check valve for closing said second passage, means for holding said check valve in an open position where said piston is in a given position, spring means for normally holding said piston in said given position, and a deceleration responsive valve element for closing said first passage and initiating movement of said piston against said spring, whereby said check valve element will be forced to close.

11. A brake pressure control device for a vehicle including a housing having an inlet opening adapted to be connected to a source of fluid pressure, a first outlet opening, a second outlet opening, a first passage in fluid communication between said inlet opening and said first outlet opening and a bore having a large diameter portion in fluid communication with said inlet opening at one end thereof and with said second outlet opening at the other end thereof, said bore having a small diameter portion in fluid communication with said first outlet opening, a piston in said bore having a large diameter portion sealingly and slidably fitted in said large diameter portion and a small diameter portion sealingly and slidably fitted in said small diameter bore portion, a second passage in said piston providing fluid communication through said piston from said inlet opening to said second outlet opening, a deceleration responsive valve element adapted to close said first passage and initiate movement of said piston, and a check valve element adapted to close said second passage upon movement of said piston.

References Cited in the file of this patent
UNITED STATES PATENTS
2,218,194     Freeman _____ Oct. 15, 1940